United States Patent [19]

Toyama et al.

[11] Patent Number: 5,445,707

[45] Date of Patent: Aug. 29, 1995

[54] METHOD OF MANUFACTURING ARTICLE HAVING MAGNETIC PATTERNS

[75] Inventors: Kiyoshi Toyama; Masayuki Togawa, both of Gifu, Japan

[73] Assignee: Teijin Seiko Co., Ltd., Osaka, Japan

[21] Appl. No.: 255,911

[22] Filed: Jun. 7, 1994

Related U.S. Application Data

[62] Division of Ser. No. 33,373, Mar. 18, 1993, which is a division of Ser. No. 784,538, Oct. 29, 1991, abandoned.

[30] Foreign Application Priority Data

Nov. 5, 1990 [JP] Japan .................................. 2-300653

[51] Int. Cl.6 .......................... B44C 1/22; C03C 15/00; C23F 1/02
[52] U.S. Cl. ........................................ 216/22; 216/39; 216/48; 216/99
[58] Field of Search ................ 156/643, 644, 647, 657, 156/656, 659.1; 427/128, 129; 205/90

[56] References Cited

U.S. PATENT DOCUMENTS

4,948,460 8/1990 Sandaiji et al. .................. 156/647 X

Primary Examiner—William Powell
Attorney, Agent, or Firm—Lane, Aitken & McCann

[57] ABSTRACT

An article comprising a substrate formed with predetermined patterns and magnetized magnetic substances arranged in the substrate in accordance with the predetermined patterns, and a method of manufacturing an article with magnetized magnetic substances arranged according to predetermined patterns, comprising the steps of arranging said magnetic substances in a substrate in accordance with the predetermined patterns and magnetizing the magnetic substances.

9 Claims, 5 Drawing Sheets

METHOD OF MANUFACTURING ARTICLE HAVING MAGNETIC PATTERNS

This is a divisional of copending application Ser. No. 08/033,373 filed on Mar. 18, 1993, which is a divisional of Ser. No. 07/784,538 filed Oct. 29, 1991, now abandoned.

FIELD OF THE INVENTION

The present invention relates to an article, such as a magnetic scale, with having predetermined magnetic patterns, and a method of manufacturing the same.

DESCRIPTION OF THE PRIOR ART

Generally, a magnetic recording and regenerating apparatus is provided with a magnetic head made of an electromagnet, etc., and a magnetic substance made of minute magnets, etc. In the case of the magnetic recording, the magnetic head generates magnetic field that varies in accordance with record information, and the residual magnetism of the magnetic substance moving through the magnetic field varied by that record information is caused to change in position. The record information is then recorded on the magnetic substance on basis of the positional change of the residual magnetism. On the other hand, in the case of the magnetic regeneration, the magnetic head detects the positional change of the residual magnetism of the magnetic substance as a voltage change, thereby regenerating the record information out of the magnetic substance.

The principles of the magnetic recording and regeneration as above mentioned have also been utilized in a magnetic sensor. That is, in the magnetic sensor, predetermined magnetic patterns are manufactured with high accuracy of position by the magnetic head for recording, and the magnetic patterns are detected by the magnetic head for detection to acquire information on a position.

Figure 15:
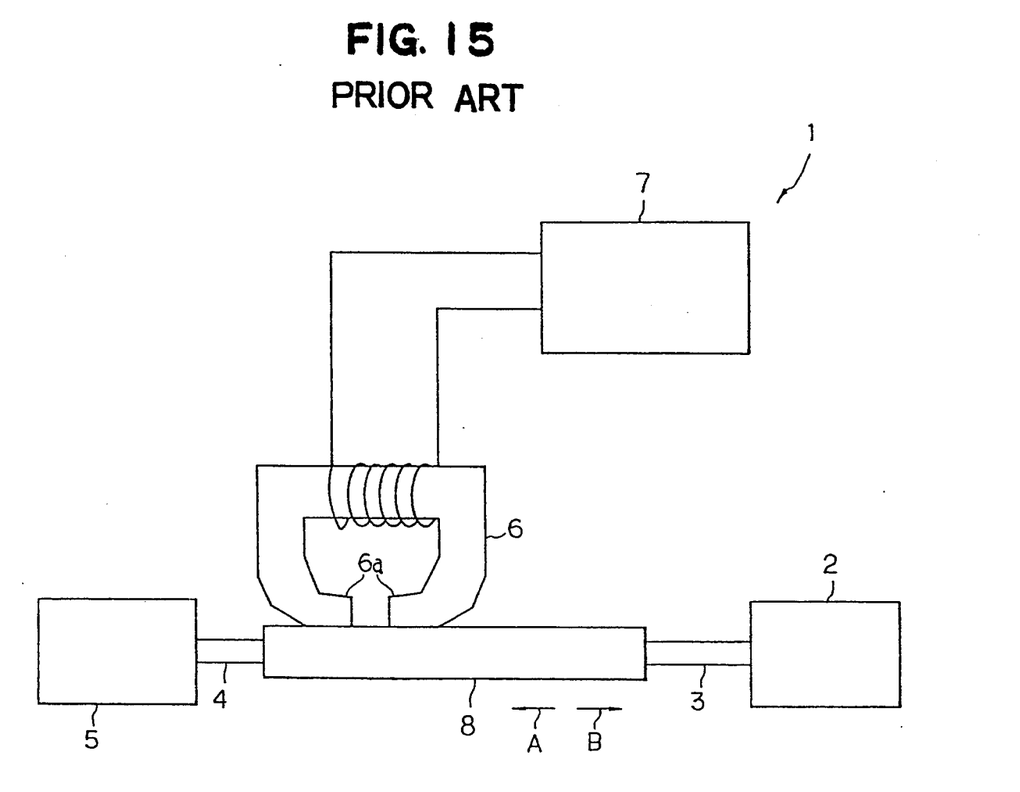
FIG. 15 is a schematic view of a prior-art magnetic pattern manufacturing apparatus.

As an example of a conventional method of manufacturing magnetic patterns, a method of manufacturing linear-type magnetic patterns will hereinafter be described. First of all, a magnetic pattern manufacturing apparatus 1 is prepared as shown in FIG. 15. The magnetic pattern manufacturing apparatus 1 comprises a position detector 2, interconnecting members 3 and 4, an actuator 5, a magnetic head 6 and an electric current voltage converting circuit 7. A magnetic record medium 8 is connected to the position detector 2 and the actuator 5 through the interconnecting members 3 and 4. The actuator 5 causes the magnetic record medium 8 to move in the opposite directions indicated by the arrows A and B in FIG. 15 with high accuracy of position, and the position of the magnetic record medium 8 is detected by the position detector 2.

If the record medium 8 is moved and fixed to a predetermined position by the actuator 5, then it contacts with the head ends 6a and 6a of the magnetic head 6. Electric current is then applied to the coil of the magnetic head 6 by the electric current voltage converting circuit 7 so that magnetic field is generated. As a consequence, the magnetic record medium 8 in the neighborhood of the magnetic head ends 6a and 6a is partly magnetized.

Subsequently, the magnetic record medium 8 is moved to another predetermined position by the actuator 5. More, specifically, the position of the magnetic record medium 8 during movement is always detected by the position detector 2, so that the magnetic record medium 8 is moved and fixed to a desired position by the actuator 5 on the basis of the result of detection of the position detector 2. The magnetic record medium 8 is then partly magnetized by the magnetic head 6 in the manner as above mentioned. In a similar manner, if all of predetermined portions of the magnetic record medium 8 are magnetized, the magnetic record medium 8 having predetermined magnetic patterns, namely, a magnetic scale will be manufactured.

In the conventional method of manufacturing the magnetic scale, however, there are the drawbacks that it is difficult to improve the resolution of the magnetic pattern, the manufacturing time becomes long, and a signal-to-noise (S/N) ratio of a detection signal at the time of position detection is decreased, for the following reasons.

That is to say, the resolution of the magnetic scale depends upon the accuracy of magnetization, so a manufacturing apparatus requires a large equipment investment. It is therefore difficult to improve the resolution of the magnetic scale.

In addition, the magnetizing operation is required many times to form magnetic patterns on the magnetic record medium 8, so that it takes a long period of time to manufacture the magnetic scale.

Furthermore, since the leakage flux of the magnetic head 6 is used when the magnetic record medium 8 is magnetized, a powerful magnetic field cannot be applied to the magnetic record medium 8. As a consequence, if the magnetic record medium 8 is used to detect a position, the S/N ratio of the position signal becomes smaller.

The present invention, which is summarized and described in detail below, contemplates resolution of the foregoing problems encountered in a prior-art magnetic scale and a prior-art method of manufacturing the magnetic scale.

SUMMARY OF THE INVENTION

In accordance with one important aspect of the present invention, there is provided an article comprising a substrate formed with predetermined patterns and magnetized magnetic substances arranged in the substrate in accordance with the predetermined patterns.

In accordance with another important aspect of the present invention, there is a method of manufacturing an article with magnetized magnetic substances arranged according to predetermined patterns, comprising the steps of arranging said magnetic substances in a substrate in accordance with the predetermined.patterns and magnetizing the magnetic substances.

In accordances with yet another important aspect of the present invention, there is a method of manufacturing an article with magnetized magnetic substances arranged according to predetermined patterns, comprising the steps of forming grooves respectively corresponding to the predetermined patterns in a substrate used for anisotropically etching, burying the magnetic substances into the grooves and magnetizing the magnetic substances.

BRIEF DESCRIPTION OF THE DRAWINGS

The features and advantages of the present invention will be more clearly understood from the following description taken in conjunction with the accompanying drawings in which:

FIG. 9 (a) is a vertical cross-sectional view of the oxidized silicon substrate after the anisotropic etching process;

FIG. 9 (b) is a horizontal cross-sectional view taken along a horizontal plane indicated by line X—X in FIG. 9 (a);

FIG. 10 (a) is a vertical cross-sectional view of the oxidized silicon substrate having magnetic substances buried in the grooves thereof;

FIG. 10 (b) is a horizontal cross-sectional view taken along a horizontal plane indicated by line Y—Y in FIG. 10 (a);

DESCRIPTION OF THE PREFERRED EMBODIMENTS

A method of manufacturing a magnetic scale (or an encoder plate) according to the present invention will be hereinafter described with reference to FIGS. 1 to 14 of the drawings.

Figure 1:
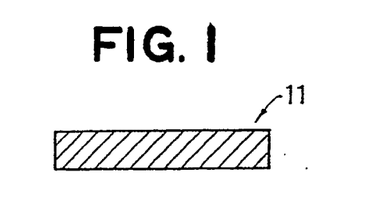
FIG. 1 is a vertical cross-sectional view of a silicon substrate.

A silicon (Si) substrate 11, as illustrated in FIG 1., is made of singlecrystal (monocrystalline) Si or singlecrystal Si having impurities such as nitrogen or boron confused therein. Dust and dirt adhered to the Si substrate 11 are removed therefrom in a way similar to a cleaning method of a semiconductor device, so that the Si substrate 11 is cleaned. For example, a Si substrate used for integrated circuit fabrication may be used as the Si substrate 11. The Si substrate 11 reacts on acids or alkalis and, depending upon kinds of those, can be etched by a so-called anisotropic etching in which a direction of reaction is selective by the crystal directions of the Si substrate.

Figure 2:
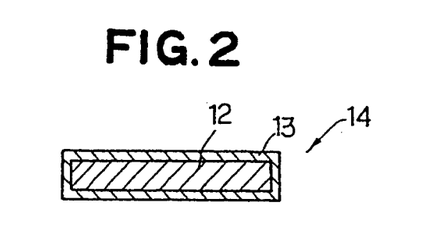
FIG. 2 is a vertical cross-sectional view of an oxidized silicon substrate formed by oxidizing the silicon substrate shown in FIG. 1.

Next, the cleaned surface portion of the Si substrate 11 is oxidized by an oxidizing process, and an oxidized Si substrate 14 comprising a Si base 12 and a silicon dioxide ($SiO_2$) layer 13 is made, as shown in FIG. 2. More specifically, the surface portion of the Si substrate 11 is oxidized for 5 hours at 1000° C. by a horizontal annulus furnace (not shown). The $SiO_2$ layer functions as a passivating layer which prevents desired portions of the oxidized Si substrate 14 from being etched in the following anisotropic etching process. During the oxidizing process, oxygen gas that has passed through hot water of 80° C. is supplied into the annulus furnace, since it is generally known that oxygen gas containing water vapor ($H_2O$) accelerates the speed of oxidization. In fact, the surface portion of the Si substrate 11 is oxidized by the oxygen in the water vapor. For example, the flow rate of the oxygen gas supplied into the annulus furnace is 0.2 l/min in a case where a Si substrate of about 10 mm square and 0.3 mm thickness is oxidized in an annulus furnace having an inner diameter of 50 mm and a length of 1000 mm.

A thin film forming process such as a chemical vapor deposition (CVD) process, a sputter deposition process or the like may be used in place of the oxidizing process as above mentioned. In addition, a layer made of a metal such as titanium (Ti), chromium (Cr) or the like, a nitride made such as trisilicon tetranitride ($Si_3N_4$) and the like, a carbide such as titanium carbide (TIC) and the like, an oxide such as aluminum hydroxide ($Al_2O_3.H_2O$) or an organic substance may be used in place of the $SiO_2$ layer 13.

Figure 3:
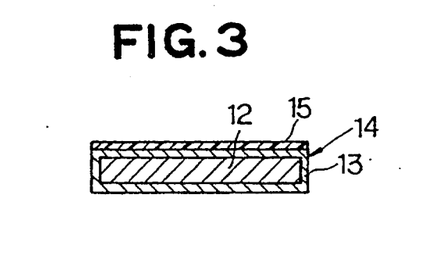
FIG. 3 is a vertical cross-sectional view of the oxidized silicon substrate coated with a photoresist.

As illustrated in FIG. 3, the surface of the oxidized Si substrate 14 is then coated with a photoresist 15 made of resist agent to be described by a spin coating process and the like. More specifically, a few drops of photoresist agent made of organic resin are dropped onto the central surface portion of the oxidized Si substrate 14. Then, the oxidized Si substrate 14 is rotated about its own center axis perpendicular to its own surface, thereby uniformly and thinly extending the resist agent to form the photoresist 15 on the oxidized Si substrate 14. Furthermore, the oxidized Si substrate 14 coated with the photoresist 15 is put into a constant temperature oven (not shown) heated to about 100° C. so that the photoresist 15 is stabilized. It is noted that AZ-1350J (POSITIVE), ONNR-20 (NEGATIVE) and the like which are durable against plasma dry etching may also be used as photoresist agent.

Figure 4:
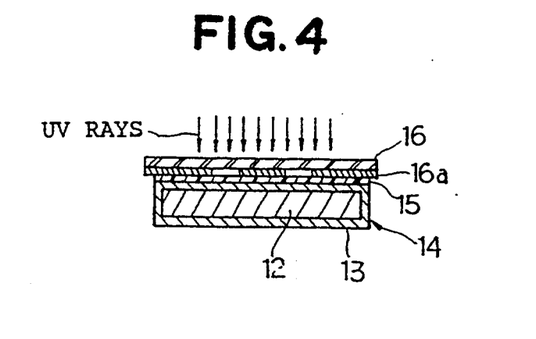
FIG. 4 is a vertical cross-sectional view of the oxidized silicon substrate coated with the photoresist during an exposing operation.

As will be seen in FIG. 4, a photomask 16 made of a glass plate having a predetermined mask pattern is then placed on the photoresist 15 in such a manner as to allow the photoresist 15 to be exposed to ultraviolet (UV) rays through the photomask 16. More precisely, the surface of the photomask 16 is selectively or partly coated with such material 16a as to prevent the UV rays from passing through the photomask 16, with result that the material coated portions of the photomask 16 where the UV rays are not allowed to pass therethrough and the material uncoated portions of the photomask 16 where the UV rays are allowed to pass therethrough are separated from each other to form the above mentioned mask pattern. It will be therefore understood that only portions of the photoresist 15 opposite to the material uncoated portions of the photomask 16 are selectively exposed to the UV rays, thereby forcing the UV rays exposed portions of the photoresist 15 on the surface of the oxidized substrate 14 to selectively photochemically react. Visible rays, electric beam, X-rays and the like may also be used as a source of light. Generally, there are known a positive photoresist soluble by UV exposure and a negative photoresist insoluble by UV exposure. In this example, the positive photoresist will be explained as being used as the photoresist 15.

Figure 5:
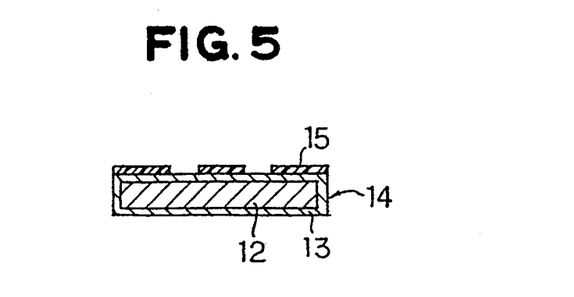
FIG. 5 is a vertical cross-sectional view of the oxidized silicon substrate partially coated with the photoresist after a developing operation.

The oxidized Si substrate 14 and the photoresist 15 are then immersed in a developer, so that the UV rays exposed portions of the photoresist 15 are dissolved and removed from the oxidized Si substrate 14, as shown in FIG. 5. This results in the fact that the surface of the oxidized Si substrate 14, namely, the SiO$_2$ layer 13 is partially uncovered. A certain pattern formed by the covered portions and the uncovered portions of the SiO$_2$ layer 13 is similar to the above mentioned mask pattern of the photomask 16.

Figure 6:
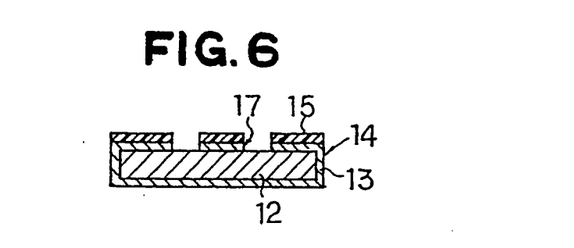
FIG. 6 is a vertical cross-sectional view of the oxidized silicon substrate coated with the photoresist after a reactive ion etching operation.

As will be seen in FIG. 6, the exposed portions of the SiO$_2$ layer 13 are etched by a reactive-ion etching (RIE) apparatus (not shown), so that windows 17 are formed in the SiO$_2$ layer 13. More specifically, the oxidized Si substrate 14 selectively coated with photoresist is placed in a vacuum chamber to which carbon tetrafluoride (CF$_4$) gas is supplied so as to be excited, thereby generating the carbon trifluoride (CF$_3$) and fluoride (F*). At this time, the exposed portions of the SiO$_2$ layer 13 are vapored by a reaction of the following equation since F element of CF$_4$ is very reactive and combined with SiO$_2$ by the reaction.

$$4CF_4 + SiO_2 \rightarrow 4CF_3 \uparrow + SiF_4 \uparrow + O_2 \uparrow$$

All molecules generated by the reaction of the foregoing equation are evaporated at room temperature and removed out of the vacuum chamber by a vacuum pump (not shown). Sulfur hexafluoride (SF$_6$) gas or gas consisting of CF$_4$ and H$_2$ may be used instead of the CF$_4$ gas. In addition, an electron cyclotron resonance (ECR) etching apparatus or a reactive ion beam etching apparatus may be used instead of the RIE apparatus.

Figure 7:
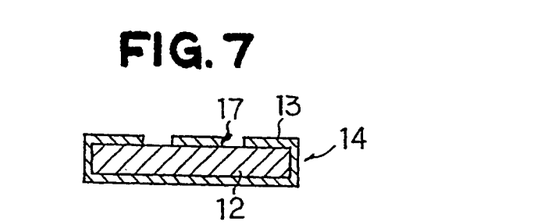
FIG. 7 is a vertical cross-sectional view of the oxidized silicon substrate after a photoresist removing operation.

Then, O$_2$ gas is supplied to the vacuum chamber for generating plasma, thereby burning and removing the photoresist 15 from the oxidized Si substrate 14 as will be seen in FIG. 7.

Figure 8:
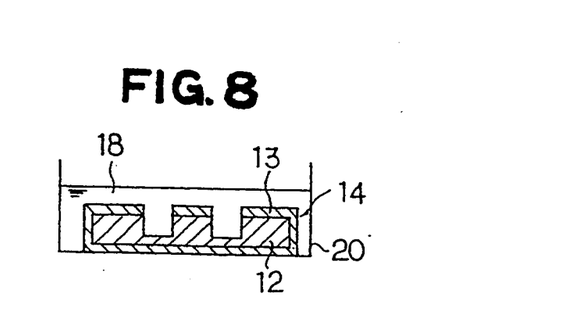
FIG. 8 is a vertical cross-sectional view of the oxidized silicon substrate during an anisotropic wet etching operation.
Figure 9A:
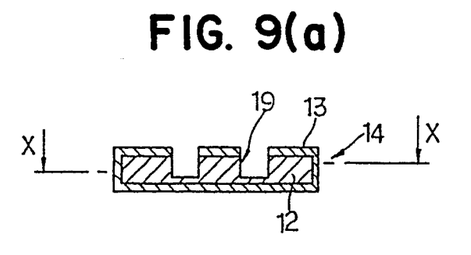
Figure 9B:
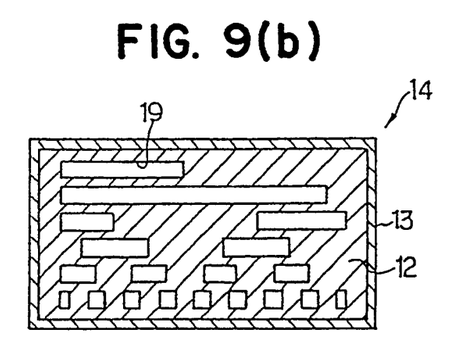

As illustrated in FIG. 8, the oxidized Si substrate 14 is then immersed in a potassium hydroxide (KOH) aqueous solution 18 and reacted until the Si base 12 is etched in a direction perpendicular to the surface of the Si oxidized substrate 14, thereby forming grooves 19 having vertical side walls as will be seen in FIGS. 9 (a) and 9 (b). The above mentioned etching process is defined as an anisotropic etching process. More specifically, the KOH is weighed and put into a beaker together with pure water measured by a measuring cylinder so as to allow the KOH and the pure water to be mixed, thereby making the KOH aqueous solution 18 of 44 wt %. While the KOH and the pure water are being mixed, exothermic reaction takes place. For this reason, the weighed pure water is calmly and intermittently fed into the beaker, and the beaker is then immersed in water received in a large size bowl, thereby radiating heat of the KOH aqueous solution 18. The fact that the KOH aqueous solution 18 is excellently hydrophilic makes possible to easily make the KOH aqueous solution of 44 wt %. The KOH aqueous solution 18 is then supplied into a large size flat bottom beaker 20 placed on a hot plate (not shown) of a stirrer (not shown), and then a stirring element is brought into the flat bottom beaker 20. After the temperature of the KOH aqueous solution 18 has been set to 80° C. and the number of rotations of the stirring element has been set to 600 rpm, the oxidized substrate 14 is immersed in the KOH aqueous solution 18. At the time that the exposed portions of the Si base 12 have been etched to a predetermined depth, the oxidized Si substrate 14 is taken out from the flat bottom beaker 20 and washed by pure water, then the KOH aqueous solution 18 is completely removed from the oxidized Si substrate 14. The oxidized Si substrate 14 is heated and dried until the humidity of the oxidized Si substrate 14 is removed therefrom. Then, the condition of the SiO$_2$ layer 13, the etched surface and the like are observed by an optical microscope. The etching rate of the monocrystalline Si is determined depending upon its crystal direction, for example, the etching rate of the <110> direction is 500 times as large as that of the <111> direction. If the surface of the Si substrate is assumed to be the (110) plane, the etching rate in the thickness direction of the Si substrate is roughly 500 times as large as that in a direction perpendicular to the thickness direction. In the case that a groove having a depth of 500 μm is formed by an anisotropic etching process, the side wall of the groove is etched by 1.0 μm, thereby making it possible to perform an anisotropic etching in the way above mentioned. If the etching rate in the depth direction of the Si substrate is from 1 to 5 μm/min, it will take 100 to 500 minutes to etch in the substrate thickness direction by, for example, 500 μm. The conditions of the anisotropic etching process in the embodiment of the present invention are as follows.

Etching solution: KOH aqueous solution
Concentration of etching solution: 44 wt %
Etching temperature: 80° C.
Etchant revolution speed: 600 rpm
Etching rate: 0.7 to 1.5 μm/min An aqueous solution of an amine such as ethylenediamine, hydrazine or the like may be used instead of the aqueous solution made of an alkaline metal hydroxide such as the foregoing KOH.

In FIG. 9 (a), the portions of the Si wafer forming the bottoms of the grooves 19 remain, but they can be completely removed by etching, in case of need.

The foregoing processes constitute a first step of forming grooves 19 respectively corresponding to the predetermined patterns in the substrate 11 used for anisotropically etching by a photoetching process according to the present invention.

Figure 10A:
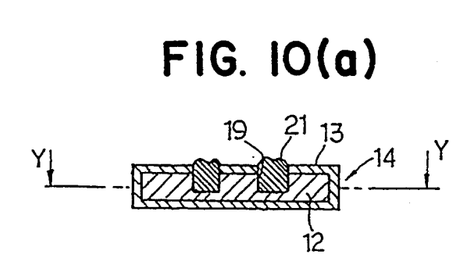
Figure 10B:
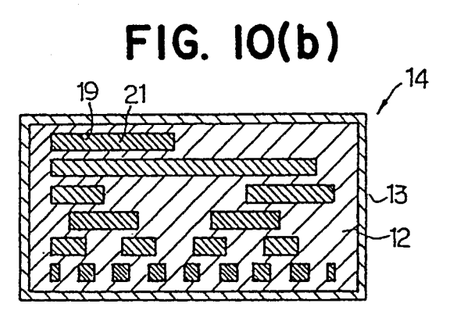

Then, magnetic substances 21 are buried in the grooves 19 of the oxidized Si substrate 14, respectively, as shown in FIGS. 10 (a) and 10 (b). As a method of burying the magnetic substances 21, there are the following four different methods.

In the first method, ferrite magnetic powder having a diameter of 1 to 5 μm is put into the grooves 19. A different Si substrate is then laid on the top of the oxidized Si substrate 14 and pressed against the oxidized Si substrate 14, thereby increasing the density of the ferrite magnetic powder.

In the second method, the Si substrate 14 is set in a vacuum film forming apparatus, and a sputter deposition process is performed by using a hard ferrite plate as a target. This process is similar to a usual sputtering process.

In the third method, application containing magnetic powder used for a magnetic tape or magnetic diskette, etc. is poured into the grooves 19 of the Si substrate 14. Then, the volatile material of the application is vaporized, thereby increasing a volume ratio of the magnetic powder. More specifically, the ferrite magnetic powder is sufficiently mixed with an organic liquid binder so as to uniformly scatter the magnetic powder in the binder liquid. However, it is necessary that air bubbles caused by entrained air are prevented from occurring during mixing. Intensity of a magnetic field is affected by the volume ratio of the magnetic powder, i.e., the intensity of a magnetic field varies in proportion to the volume ratio of magnetic powder. The liquid binder mixed with magnetic powder is dropped into the grooves 19 to the extent that it somewhat overflows the grooves 19. The Si substrate 14 is placed on a hot plate and heated to about 50° C., so that the volatile material of the liquid binder is vaporized. This results in a relative increase in the volume ratio of the magnetic powder.

In the fourth method, a magnetic substance of metal is educed by an electroplating process in such a manner that the educed magnetic substances are buried into grooves 19.

Figure 11:
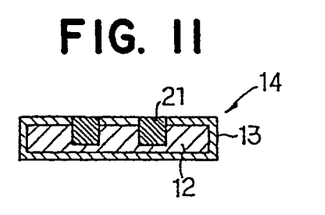
FIG. 11 is a vertical cross-sectional view of the oxidized silicon substrate after a polishing operation.

In all of the first to the fourth methods, the surfaces of the magnetic substances 4 become ragged as shown in FIG. 10 (a), so that the surfaces of the magnetic substances 4 are required to be polished until they become smooth as shown in FIG. 11.

Figure 12:
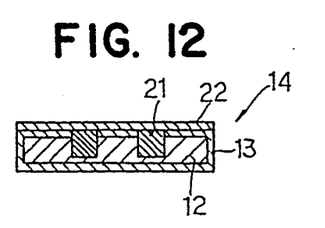
FIG. 12 is a vertical cross-sectional view of the oxidized silicon substrate coated with a protecting film.

Then, a SiO2 film having a thickness of 1.0 μm is formed on the oxidized Si substrate 14 by a chemical vapor deposition (CVD) process in order to produce a protecting film 22. Alternatively, a thin film may be adhered to the Si substrate 14, or the Si substrate 14 may be coated with a resin, paint or the like for producing the protecting film 22.

The foregoing processes constitute a second step of burying the magnetic substances 21 into the grooves 19 formed in the above mentioned first step.

Figure 13:
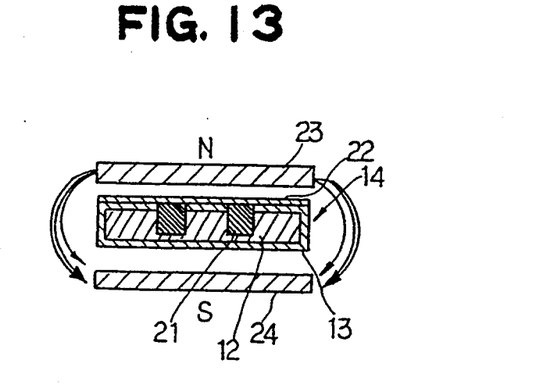
FIG. 13 is a vertical cross-sectional view of the oxidized silicon substrate during a magnetizing operation.

Then, as shown in FIG. 13, the magnetic substances 21 are magnetized by a magnetizing apparatus comprising a north pole plate 23 and a south pole plate 24, i.e., the north and south pole plates 23 and 24 being positioned in such a manner that the north pole plate 23 is opposed to and spaced apart from the south pole plate 24 by way of the oxidized Si substrate 14, so that the magnetic substances 21 are magnetized by a magnetic field having a direction perpendicular to the surface of the oxidized Si substrate 14.

This process constitutes a third step of magnetizing magnetic substances 21 buried into the grooves 19 in the above mentioned second step.

Figure 14:
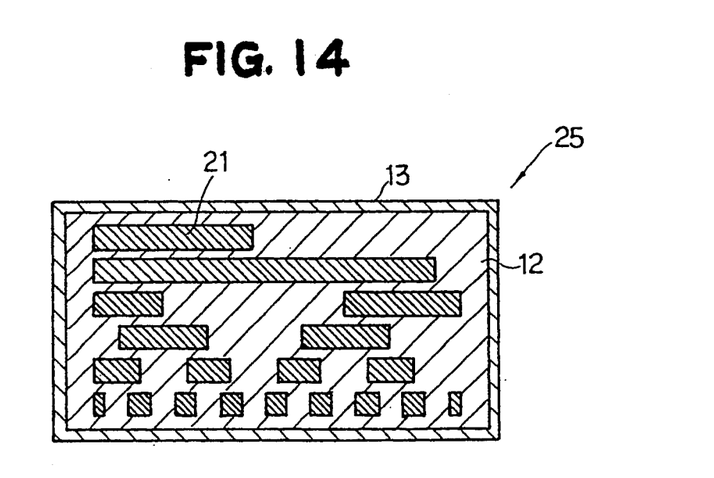
FIG. 14 is a horizontal cross-sectional view of the oxidized silicon substrate with magnetized substances arranged in accordance with predetermined patterns.

With the foregoing processes, the oxidized Si substrate 14 having predetermined magnetic patterns is manufactured. That is, a magnetic scale 25 such as that shown in FIG. 14 is manufactured.

As has been described hereinbefore, the present invention is such that a method of manufacturing an article with magnetized magnetic substances arranged according to predetermined patterns comprises the steps of forming grooves respectively corresponding to the predetermined patterns in a substrate used for anisotropically etching, burying the magnetic substances into the grooves and magnetizing the magnetic substances. Accordingly, an extremely precise magnetic patterns can be easily manufactured, and furthermore, various sorts of extremely precise magnetic patterns can be easily provided by exchanging of mask patterns of photo lithography.

In addition, the magnetic substances can be magnetized at one time, thereby greatly shortening the time needed for magnetization. In addition, in each process, a large number of substrate materials can be treated, thereby shortening the time needed for manufacturing magnetic patterns.

Furthermore, the magnetic patterns having a powerful magnetism can be obtained, so that a powerful intensity of a magnetic field can be generated at the time of detecting an electric signal, thereby increasing the S/N ratio of the signal.

While it has been described that the article is the magnetic scale 25, it is noted that it may also be applicable to a rotor of a rotary type motor with permanent magnets and to an armature or a stator of a linear type motor with permanent magnets. These motors are classified into a direct current motor and an alternating current motor and can be used as stepping motors, direct current brushless motors or the like. Furthermore, the article of the present invention is applicable to a generator.

Although it has been described that the grooves 19 are etched by a wet etching process, it is noted that they may also be etched by a dry etching process such as a reactive-ion etching (RIE) process. In the case of the dry etching process, the substrate is not limited to a single-crystal silicon.

What we claim is:

1. A method of manufacturing an article with magnetized magnetic substances arranged according to patterns, comprising the steps of:

oxidizing a substrate made of silicon or silicon containing impurities in such a manner that a passivating layer of silicon dioxide is formed on an outer surface of the oxidized substrate;

coating a photoresist on said passivating layer formed on said outer surface of said oxidized substrate;

exposing said photoresist through a photomask having said patterns so that it is formed with said patterns;

removing the exposed or unexposed parts of said photoresist from said oxidized substrate by dissolving it in a developer in such a manner that said passivating layer is partially uncovered;

etching the uncovered portions of sid passivating layer from said oxidized substrate in such a manner that windows are formed in said passivating layer;

anisotropically etching said oxidized substrate through said windows so as to form grooves in said oxidized substrate;

burying said magnetic substances into said grooves; and magnetizing said magnetic substances.

2. A method as set forth in claim 1, in which said anisotropically etching step is performed by a wet etching process.

3. A method as set forth in claim 1, in which said anisotropically etching step is performed by a dry etching process.

4. A method as set forth in claim 1, in which said etching step for the uncovered portions of said passivating layer from said oxidized substrate is performed by a dry etching process.

5. A method of manufacturing an article with magnetized magnetic substances arranged according to patterns, comprising the steps of:

coating a substrate made of silicon or silicon containing impurities with thin film by a thin film forming process such as chemical vapor deposition and sputter deposition;

coating a photoresist on said coated film;

exposing said photoresist through a photomask having said patterns so that it is formed with said patterns;

removing the exposed or unexposed parts of said photoresist from said substrate by dissolving it in a developer in such a manner that said film is partially uncovered;

etching the uncovered portions of said film from substrate in such a manner that windows are formed in said film;

anisotropically etching said substrate through said windows so as to form grooves in said substrate;

burying said magnetic substances into said grooves; and magnetizing said magnetic substances.

6. A method as set forth in claim 5, in which said anisotropically etching step is performed by a wet etching process.

7. A method as set forth in claim 5, in which said anisotropically etching step is performed by a dry etching process.

8. A method as set forth in claim 5, in which said etching step for the uncovered portions of said film from said substrate is performed by a dry etching process.

9. A method as set forth in claim 1, in which said thin film is made of a metal, nitride, carbide, oxide or organic material.

* * * * *